A. W. RUDOLPH.
SELF IRRIGATING FLOWERPOT.
APPLICATION FILED JUNE 12, 1920.
1,400,628. Patented Dec. 20, 1921.
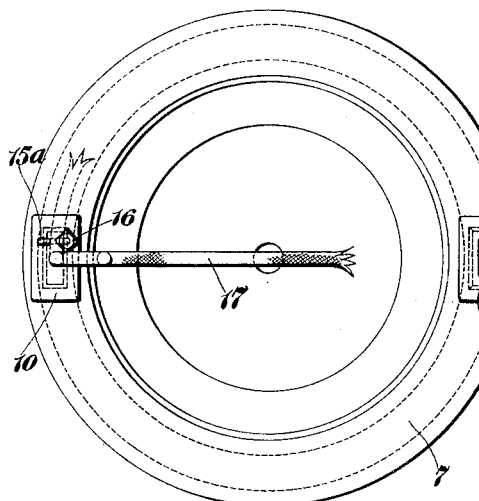
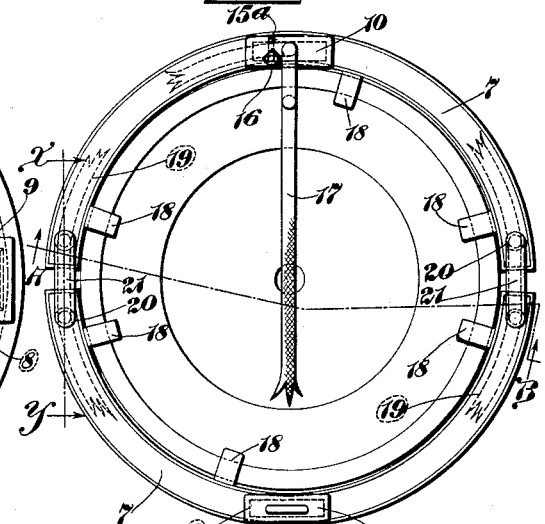
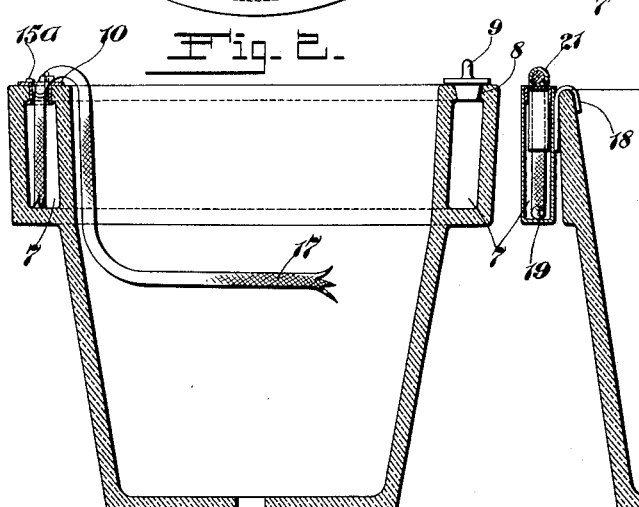
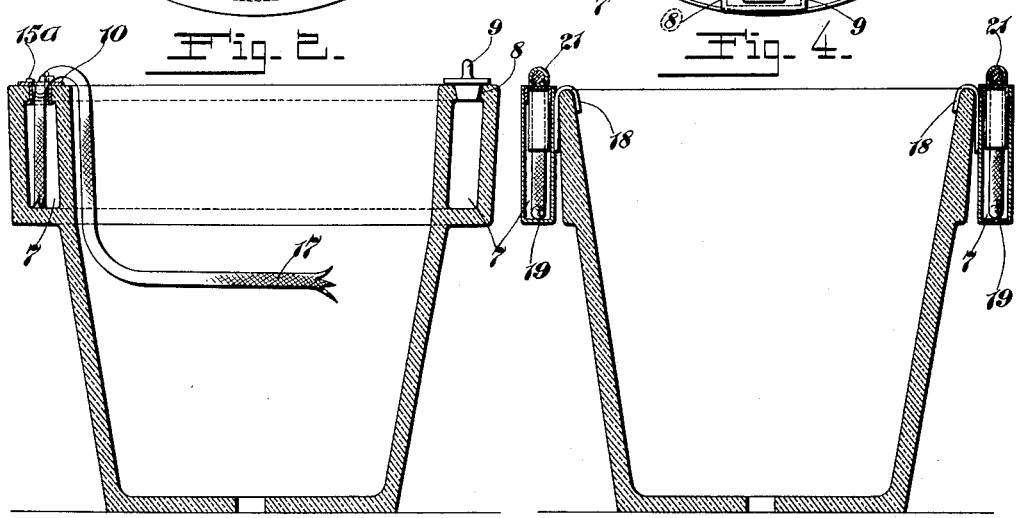
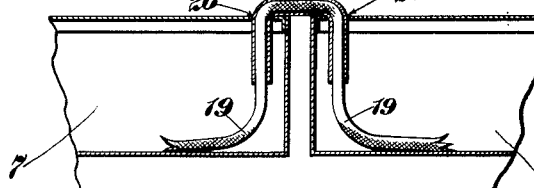
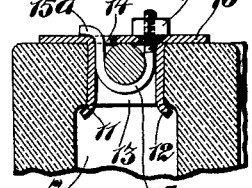
WITNESS:
Charles A. Becker
INVENTOR.
Alfred W. Rudolph
BY Small & Small
HIS ATTORNEYS.

UNITED STATES PATENT OFFICE.

ALFRED W. RUDOLPH, OF ST. LOUIS, MISSOURI.

SELF-IRRIGATING FLOWERPOT.

1,400,628.  Specification of Letters Patent.  Patented Dec. 20, 1921.

Application filed June 12, 1920. Serial No. 388,576.

*To all whom it may concern:*

Be it known that I, ALFRED W. RUDOLPH, a citizen of the United States of America, residing at St. Louis, in the State of Missouri, have invented a new and useful Self-Irrigating Flowerpot, of which the following is a specification.

This invention has for its prime object the provision of simple, inexpensive and efficient means for insuring a continuous supply of moisture to the roots of potted plants and devices for controlling said supply so that the soil may be kept in the condition best suited to the particular plants under cultivation.

Figure 1 of the accompanying drawing is a top plan view of a flower pot comprising my invention; Fig. 2, a vertical sectional elevation of the pot shown in Fig. 1; Fig. 3, a top plan view of a pot comprising a modification of the invention as depicted in Fig. 1; Fig. 4, a vertical sectional elevation taken along line A—B of Fig. 3; Fig. 5, a detail view, on enlarged scale, taken along line X—Y of Fig. 3; and Fig. 6, a cross-section, on enlarged scale, depicting the preferred means for controlling the supply of moisture.

Referring to Figs. 1 and 2 it will be noted that, in forming the pot from clay or other suitable material, I provide its upper portion with an annular chamber 7 constituting a reservoir which may be filled from time to time through aperture 8 having a removable cover 9. Disposed opposite said aperture is a plate 10 having depending ribs 11—12 which frictionally engage the walls of a narrow opening 13 communicating with said chamber as shown in Fig. 6. Plate 10 is slotted at 14 for the projection therethrough of the hooked extremity 15ª of a substantially U-shaped rod 15 whose other extremity likewise projects through said plate and is threaded for the retention of a nut 16.

Water is conveyed to the soil from chamber 7 by an absorbent wick 17 which passes through plate 10 and is engaged by rod 15, it being obvious that the quantity of water supplied to the soil may be diminished by simply drawing said rod upward through rotation of nut 16 so as to compress said wick against said plate.

The modification shown in Figs. 3, 4 and 5 consists in the provision of chamber 7 as a detachable element which may be made of copper or other suitable metal in two or more sections hung on the rim of ordinary flower pots by hooks 18 and connected, to equalize the water supply, by absorbent wicks 19 which pass through apertures 20 provided in the top of each section near the extremities thereof, each of said wicks being partly incased by rubber tubing 21 as shown in Fig. 5 so as to prevent seepage and evaporation. The sectional construction of chamber 7 is preferred as it enables one to attach or remove this element irrespective of the size of the plant and without damage to the foliage, but it will be understood that the detachable chamber may be made non-sectional for application to pots containing young plants.

Having thus fully described the invention and the purpose thereof, what I claim as new and desire to secure by Letters-Patent is:—

1. A flower pot comprising a water-holding chamber, an absorbent member extending from said chamber to the soil within the pot, and means for controlling the amount of water conveyed by said member.

2. A flower pot comprising a water-holding chamber, a member adapted to convey the water from said chamber to the soil within the pot, and means for compressing said member so as to control the amount of water conveyed thereby.

3. A flower pot comprising a water-holding chamber, a flexible member extending from said chamber to the soil within the pot adapted to convey the water, and means for controlling the amount of water conveyed by said member.

4. A flower pot comprising a water-holding chamber, an absorbent member extending from said chamber to the soil within the pot, and means for compressing said member so as to control the amount of water conveyed thereby.

5. A flower pot comprising a water-holding chamber, a flexible member extending from said chamber to the soil within the pot adapted to convey the water, and means for compressing said member so as to control the amount of water conveyed thereby.

6. An attachment for flower pots comprising a water-holding chamber formed in two or more sections, hooks secured to said sections for suspension thereof upon the rim of such pots, and members disposed adjacent to the abutting ends of said sections and communicating with the interior thereof adapted to equalize the amount of water therein.

7. An attachment for flower pots comprising a water-holding chamber formed in two or more sections, hooks secured to said sections for suspension thereof upon the rim of such pots, members disposed adjacent to the abutting ends of said sections and communicating with the interior thereof adapted to equalize the amount of water therein, and a member adapted to convey the water from said chamber to the soil within the pot.

8. An attachment for flower pots comprising a water-holding chamber formed in two or more sections, hooks secured to said sections for suspension thereof upon the rim of such pots, members disposed adjacent to the abutting ends of said sections and communicating with the interior thereof adapted to equalize the amount of water therein, a member adapted to convey the water from said chamber to the soil within the pot, and means for controlling the amount of water conveyed by said member.

9. An attachment for flower pots comprising a water-holding chamber formed in two or more sections, hooks secured to said sections for suspension thereof upon the rim of such pots, and absorbent members disposed adjacent to the abutting ends of said sections and communicating with the interior thereof adapted to equalize the amount of water therein.

10. An attachment for flower pots comprising a water-holding chamber formed in two or more sections, hooks secured to said sections for suspension thereof upon the rim of such pots, absorbent members disposed adjacent to the abutting ends of said sections and communicating with the interior thereof adapted to equalize the amount of water therein, and a member adapted to convey the water from said chamber to the soil within the pot.

11. An attachment for flower pots comprising a water-holding chamber formed in two or more sections, hooks secured to said sections for suspension thereof upon the rim of such pots, absorbent members disposed adjacent to the abutting ends of said sections and communicating with the interior thereof adapted to equalize the amount of water therein, a member adapted to convey the water from said chamber to the soil within the pot, and means for controlling the amount of water conveyed by said member.

12. An attachment for flower pots comprising a water-holding chamber, hooks secured thereto for suspension thereof upon the rim of such pots, a member adapted to convey the water from said chamber to the soil within the pot, and means for compressing said member so as to control the amount of water conveyed thereby.

ALFRED W. RUDOLPH.

Witnesses:
LEE LICHTENSTEIN,
W. KEANE SMALL.